March 4, 1969     D. A. HOLT     3,430,546

MULTI-FLASH, FLASHCUBE ADAPTER ATTACHMENT FOR CAMERAS

Filed Oct. 31, 1966

*INVENTOR:*
DEAN A. HOLT.

BY:
MALLINCKRODT & MALLINCKRODT

ATTORNEYS.

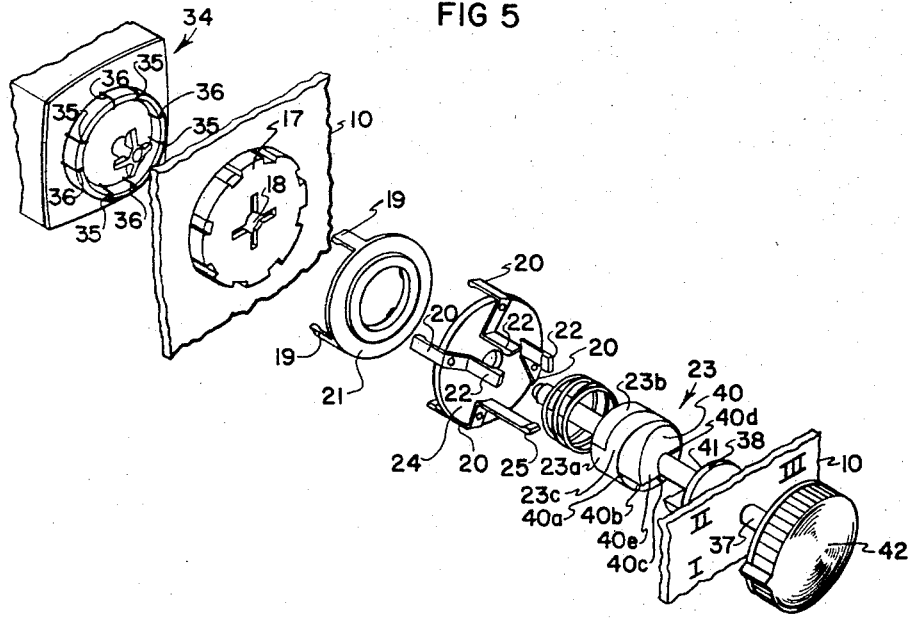
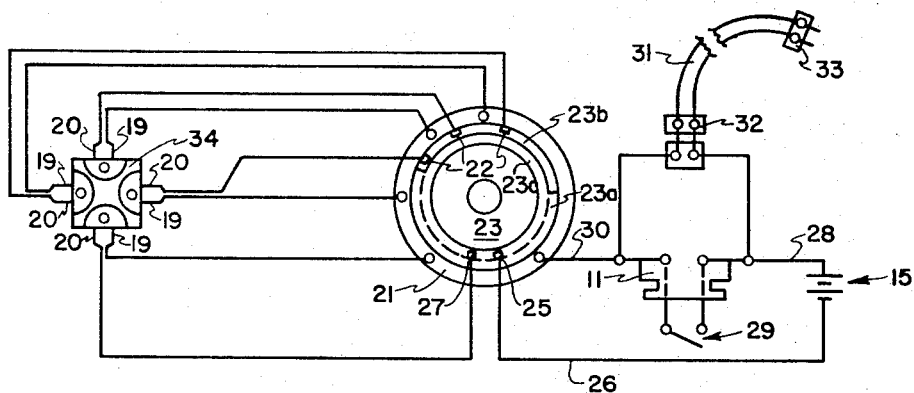

March 4, 1969  D. A. HOLT  3,430,546
MULTI-FLASH, FLASHCUBE ADAPTER ATTACHMENT FOR CAMERAS
Filed Oct. 31, 1966  Sheet 3 of 3

INVENTOR:
DEAN A. HOLT.
BY:
MALLINCKRODT & MALLINCKRODT
ATTORNEYS.

United States Patent Office 3,430,546
Patented Mar. 4, 1969

3,430,546
MULTI-FLASH, FLASHCUBE ADAPTER
ATTACHMENT FOR CAMERAS
Dean A. Holt, 518 19th St., Evanston, Wyo. 82930
Filed Oct. 31, 1966, Ser. No. 590,692
U.S. Cl. 95—11.5                               2 Claims
Int. Cl. G03b 9/70

ABSTRACT OF THE DISCLOSURE

Photographic apparatus comprising a housing having a socket plate to receive a flashcube. Pairs of electrical contacts are carried by the plate. A cam device fixed to a shaft is provided with non-conductive and conductive portions engagable with the electrical contacts to sequentially connect each pair of contacts into a flash circuit. A reflector fixed to the housing surrounds the socket plate to direct the light.

---

Figure 1:
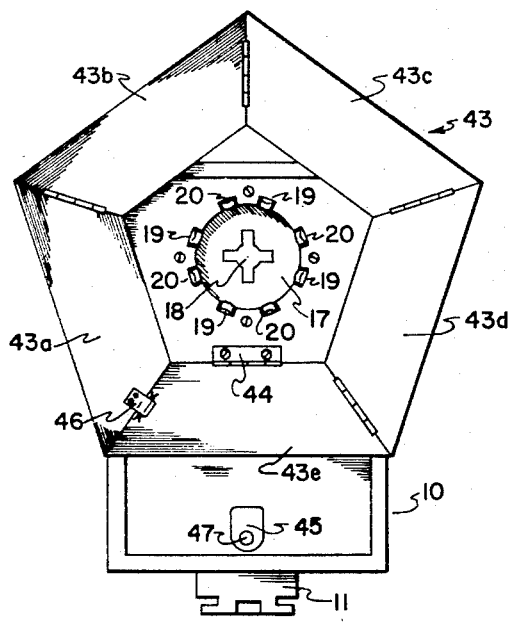

This invention relates to devices for providing rapid sequential flashing light for use in photographic picture taking.

In recent years a number of devices have been provided that will enable a photographer to rapidly position a flashbulb for synchronized firing in response to movement of a shutter actuator on his camera.

Many of these devices, such as those shown in U.S. Patents Nos. 2,622,188, 2,839,667, 2,985,748, 3,014,122, and 3,087,318, include support mechanism for a number of individual bulbs that are sequentially manually moved, or manually released to be automatically moved, into flashing position. In addition, there has recently been developed a self-contained unit including reflector surfaces and a plurality of flashbulbs known as a flashcube. This cube has heretofore been usable only on cameras equipped with a means for rotating the cube so that the reflector surfaces adjacent each bulb will direct the flash toward the subject being photographed. Actuation of the camera film winding mechanism sequentially rotates the individual bulbs of the flashcube into firing position. Because they are compact, durable and of relatively low cost, the flashcubes have gained wide popularity among persons owning cameras equipped to use them.

It is an object of the present invention to provide an attachment, adaptable to virtually all cameras, that will enable the flashcubes to be used in combination therewith to produce rapid sequence photographs.

The development of low cost strobe lights having a fast recovery rate has to some extent reduced the number of flashbulbs and flashcubes in current use, but since the strobe lights with which I am familiar have one or at most two intensities, they are little or no better than the ordinary sequentially fired flashbulbs when additional light is needed to effectively obtain a photograph.

It is, therefore, another object of the present invention to provide a camera attachment that will not only allow flashcubes to be used in the obtaining of rapidly sequenced photographs, but that will also allow the simultaneous firing of any number of the bulbs contained within the flashcube and the directing of the flashed light toward the subject being photographed.

Because the photographer may not always have flashcubes available, or may at times prefer to use flashbulbs, another object of the invention is to provide such an attachment that will also individually flash any of the usual commercially available flashbulbs.

It is necessary that any such unit be compact in order for it to be commercially successful and it is therefor, still another object to provide a unit that is compact and attractive in appearance, yet so constructed that it can be produced at low cost.

Outstanding features of the invention are the receiver plate that is adapted to receive and hold a flashcube, or with addition of a special adapter unit, any of the presently available flashbulbs, in firing position; a circuit, including an actuator knob and contacts movable by the knob to arrange one or more of the bulbs of a flashcube selectively for firing in response to operation of the camera shutter or to connect a conventional flashbulb for firing; a folding type reflector that can be inexpensively constructed for properly directing light from either a flashcube or a flashbulb; and an ejector operable to discharge spent flashcubes and flashbulbs and to ready the unit to receive fresh ones.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

Figure 2:
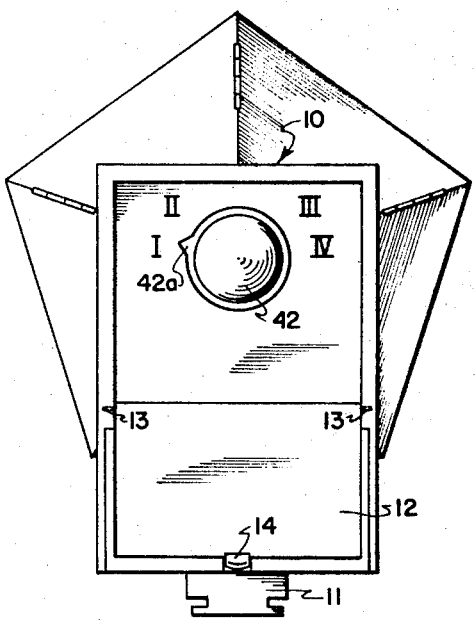
Figure 3:
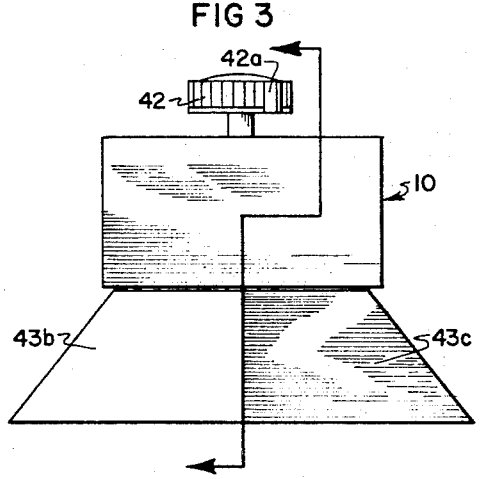
Figure 4:
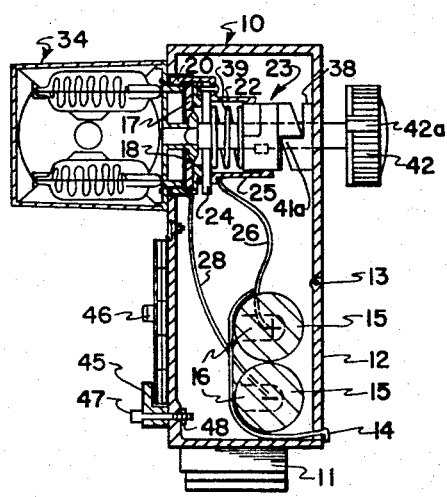
Figure 7:
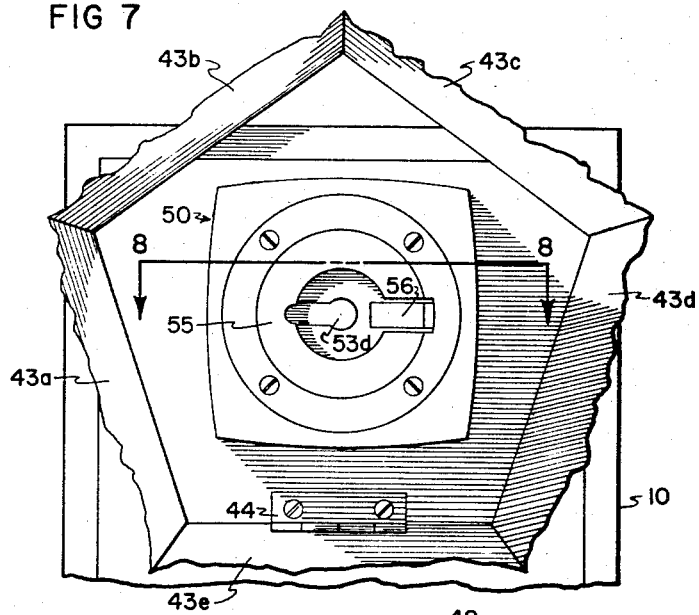
Figure 8:
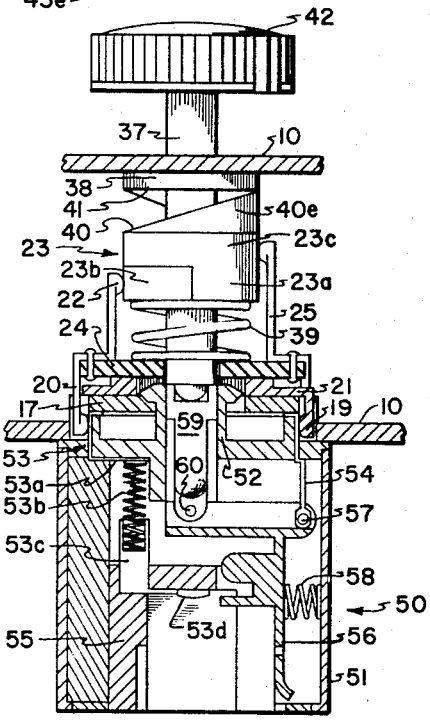

In the drawings:

FIG. 1 is a front elevation view of the invention;

FIG. 2, a rear elevation view;

FIG. 3, a top plan view;

FIG. 4, a vertical section view, taken on the line 4—4 of FIG. 3;

FIG. 5, an exploded perspective view;

FIG. 6, a schematic circuit diagram;

FIG. 7, an enlarged front elevation view of another embodiment of the invention, wherein a special adapter is provided to receive any of the commercially available flashbulbs, as well as flashcubes, and with the reflector and circuit housing shown fragmentarily; and FIG. 8, a horizontal section taken on the line 8—8 of FIG. 7.

Referring now to the drawings:

As illustrated the multi-flash flashcube adapter attachment of the invention includes a housing 10 that has a bayonet shoe 11 thereon, of the type conventionally used for coupling flash attachments to cameras.

An access door 12 is pivoted at 13 and forms a portion of the rear panel of the housing and a spring clip 14 latches the door to hold it closed. When the door is opened it is a simple matter to release batteries 15 from the battery clips 16 and to insert replacement batteries.

A receiver plate 17 extends through the upper front face of the housing and is adapted to hold a flashcube securely in position while the bulbs thereof are fired. Thus, the receiver plate includes a socket 18 shaped to receive and frictionally grip the projecting stem of a flashcube and four pairs of contacts 19 and 20, each pair being positioned to engage the lead wires of one of the bulbs of the flashcube.

The contacts 19 are each electrically connected to a buss bar 21 and the contacts 20 of three of the bulbs of the flashcube are connected to brushes 22 that are adapted to engage the outer surface of one end of a rotatable cam member 23. The brushes 22 are spaced between contacts 19 around an insulator ring 24 (FIG. 5) that separates them from buss bar 21. Cam member 23 includes a conductive portion 23a extending partially therearound and a non-conductive portion 23b. The conductive portion 23a is electrically connected to and preferably is formed integral with a conductive ring 23c, that surrounds the other end of the cam member 23 and is also connected, through a brush 25 that engages ring 23c and a line 26 to a free terminal of the batteries 15. The brush 22 of the other contact 20 is connected directly to the ring 23c and is, therefore, always connected to the batteries through brush 25 and line 26.

The other free terminal of the batteries is connected by a line 28, to the shoe 11 and when in use is connected through the shoe and the mating adapter of a camera on which it is used, in conventional fashion, to a switch 29 actuated by camera shutter operation. A line 30 connects the shoe and buss bar 21 to complete the circuit. Alternatively, instead of the shoe and adapter illustrated, a separate cord 31 and plug-in type jacks 32 and 33 can be used to electrically connect the attachment to a switch actuated by the camera shutter. As is conventional with flash attachments, both the shoe and electrical adapted connection arrangement and the cord and plug-in-jack arrangement are provided to enable the attachment to be used on the maximum number of cameras.

In operation, a flashcube 34 is inserted in the socket 18 and each pair of lead wires 35 and 36 provided for a bulb in the flashcube is respectively engaged by a pair of contacts 19 and 20. The contact 20 in engagement with ring 23c completes a circuit to the switch of the camera, through one flashbulb, regardless of the rotational position of contact member 23. Since in the usual starting position the other contacts 20 will be on the non-conductive portion 23b, there will be no circuits completed to their associated bulbs. Closing of the camera switch will then merely cause one bulb to flash. Rotation of the cam member 23 will sequentially place each of the other contacts 20 on the conductive portion 23a and the circuit will be completed to cause flashing of their associated bulbs upon actuation of the camera switch.

If the cam member is rotated to place all of the contacts 20 in engagement with either conductive portion 23b or ring 25, and, if they have not been previously flashed, actuation of the camera switch will energize all of the associated bulbs. If one or more of the bulbs have been previously fired, only the unfired ones will be energized. Consequently, it is possible to fire the bulbs of commercially available flashcubes individually, or in multiples of two, three or four, using almost any type of camera.

Cam member 23 is fixed to a central shaft 37 that passes freely through a cam plate 38 on the interior of the back plate of the attachment housing 10, and that is adapted to be reciprocated into and out of socket 18.

A coil spring 39 surrounds the shaft 37 between the insulator ring 24 and a non-conductive end of the cam member 23 to force a cam surface 40 of the cam member into continuous engagement with a cam surface 41 of the cam plate 38.

Cam surface 41 includes a projection 41a that is adapted to be contacted by the cam surface 40 as it is rotated by the turning of a knob 42, fixed on the shaft, outside of housing 10. A protrusion 42a on the knob acts as an indicator dial and cooperates with numbers I, II, III, and IV on the back of the housing to show the rotative position of cam member 23.

A series of notches 40a–40d are provided on a flat portion of cam surface 40 and as each notch is moved into contact with the projection 41a the contacts 19 and 20 respectively connected to the lead wires 35 and 36 of the bulbs of the flashcube are sequentially electrically connected into the firing circuit in the manner previously disclosed. After the fourth bulb has been connected in the circuit by positioning notch 40d against projection 41a continued clockwise rotation of the cam member 23 will move a gradually projecting surface 40e of the surface 40 against the projection 41a. This forces the cam member 23 away from cam plate 38, against the biasing force of spring 39, and moves the end of shaft 37 into socket 18 to eject the flashcube. Further clockwise rotation of knob 42 will cause the gradually projecting surface 40e to pass projection 41a and the spring will then abruptly move the cam member longitudinally to place the notch 40 against the projection 41a. In this position only the first bulb of the flashcube is connected in the firing circuit.

The knob 42 is spaced from housing 10 sufficiently far to allow for the required axial travel of shaft 37.

While any conventional type of fixed or folding reflector can be used to direct light from the flashing bulbs of the flashcube onto a subject being photographed, the folding one shown has been found very convenient.

As illustrated, the reflector 43 includes five trapezoidal sides 43a–43e that are hingedly interconnected. The short parallel edge of side 43e is hinged at 43 to housing 10 beneath adapter plate 17, and a latch 45 is positioned beneath hinge 43.

A catch 46 is provided between the sides 43a and 43e to releasably hold them together. When the catch 46 is released, side 43a can be folded against the back of side 43b, the face of side 43b can be folded against the face of side 43c, the back of side 43c can be folded against the back of side 43d and the face of side 43d can be folded against the face of side 43e. The entire folded assembly can then be swung about hinge 44 until the back of side 43e is against housing 10 and the latch 45 engages the back of side 43a to hold the reflector in its compact, folded position. Turning of bolt by a knurled knob 47a, into and out of nut 48 inside housing 10 tightens or releases the latch 45 as required to hold or release the reflector. Obviously, the reflector can be provided with more or fewer sides. With the illustrated five-sided reflector and with the provision of suitable catches (not shown) the user can leave one side folded to provide a four-sided reflector, if he should desire. In the event the set-up reflector does not have sufficient rigidity to hold it in place additional catches (not shown) can be provided to secure it to the housing 10.

A flashcube adapter 50, FIGS. 7 and 8, is provided to allow the attachment to be used in conjunction with conventional flashbulbs.

Adapter 50 includes a housing 51 and a base 52 that will fit into the socket 18 of plate 17 in the same manner as does a flashcube, but more tightly than will a flashcube. The tight fit prevents inadvertant ejection of the adapter, when a flashbulb is ejected in the manner to be described. A contact 53 of the adapter is then in engagement with the contacts 19 of buss bar 21 and another contact 54 is in engagement with the contacts 20 connected to insulated ring 24.

Contact 53 includes a strap 53a extending through housing 51 adjacent to base 52, a coil spring 53b having one end in engagement with strap 53a and its other end in a partial cup 53c that fits into a well provided thereon in a non-conductive sliding, socket member 55. An arm 53d extends from cup 53c into the socket member 55 to engage one terminal of a flashbulb inserted into the adapter.

The other terminal of the bulb is contacted by a latch 56 pivoted at 57. The contact 54 is electrically connected to the pivot 57. A spring 58 biases the latch 56 into bulb engaging position and as the bulb is inserted into the socket 55 one terminal on its base contacts arm 53d and the other terminal is engaged by latch 56. The spring 58 forces the latch to securely hold the bulb in place, but when shaft 37 is moved into socket 18 in response to turning of knob 42 it contacts a sliding member 59 that is in the base 52 and that is pivotally connected at 60 to latch 56. As the member 59 slides into the adaptor, latch 56 is pivoted against spring 58 and the bulb is released. The tight friction fit between the adapter and the receiver plate prevents the adapter being inadvertantly ejected from the receiver plate as shaft 37 moves into socket 18. Alternatively, a convention spring clip (not shown) or other mechanical catch could be used to positively hold the adapter until it is manually released.

A flashbulb inserted into socket 55 is connected electrically through the contacts 19 of buss bar 21 and contacts 22 of ring 24 in the same manner as the flashcubes previously described and is synchronously fired upon actuation of the camera shutter.

Whereas this invention is here described and illustrated with respect to certain forms thereof, it is to be understood that many variations are possible without departing from the subject matter particularly pointed out in the following claims, which subject matter I regard as my invention.

I claim:
1. A multi-flash, flashcube adapter attachment for cameras, comprising
   a housing;
   a receiver plate carried by said housing and forming a portion of a front wall thereof, said plate having a socket adapted to receive and grip the base of a flashcube;
   pairs of contacts spaced around said receiver plate and extending into the housing from exteriorly of said housing where each pair is adapted to engage the lead wires of a bulb of the flashcube;
   a common buss bar inside the housing electrically connected to one contact of each pair of contacts;
   a shaft extending through a rear wall into the housing, said shaft being axially reciprocable into and out of the socket;
   a movable cam member fixed to said shaft, said movable cam member including a non-conductive portion and a conductive portion, one of the other contacts of the pairs of contacts being positioned to be continuously in engagement with the conductive portion and the remaining ones of the other contacts being positioned to be in engagement with the non-conductive portion when the movable cam-member is in one position and to be sequentially placed in engagement with the conductive portion as the cam member is moved to another position;
   a fixed cam member carried by the rear wall of the housing in face-to-face relationship to the movable cam member;
   a spring biasing the movable cam member against the fixed cam member and the shaft out of the socket of the receiver plate;
   means on the shaft exteriorly of the housing, rotatable to turn the shaft and movable cam member to sequentially place the other contacts in engagement with the conductive portion and to thereafter cam the shaft into the socket;
   a power source in the housing;
   means for releasably attaching the housing to a camera;
   circuit means for connecting the common buss bar and the conductive position of the movable cam member to the power source, through a switch responsive to actuation of the camera shutter; and
   a reflector, fixed to the housing in surrounding relationship to the receiver plate and extending angularly outwardly therefrom.

2. A multi-flash, flashcube adapter for cameras, according to claim 1, wherein
   the reflector includes a plurality of reflective sides;
   hinge means connecting one of said sides to the housing;
   catch means releasably connecting another side to the one said side;
   hinge means interconnecting the one said side and one of its adjacent sides and the sides between the adjacent sides; and
   latch means carried by the housing and adapted to secure the reflector to the housing when the sides are folded together.

References Cited

UNITED STATES PATENTS

| | | | |
|---|---|---|---|
| 2,326,364 | 8/1943 | King | 240—36 X |
| 2,697,390 | 12/1954 | Kindelberger | 240—1.3 X |
| 3,075,070 | 1/1963 | Lipsitz | 240—1.3 |
| 3,096,025 | 7/1963 | Prochnow | 240—1.3 |
| 3,267,272 | 8/1966 | Fischer | 240—1.3 |
| 3,335,651 | 8/1967 | Williams et al. | 240—1.3 |
| 3,353,465 | 11/1967 | Peterson et al. | 95—11.5 |

NORTON ANSHER, *Primary Examiner.*

C. E. SMITH, *Assistant Examiner.*

U.S. Cl. X.R.

240—1.3, 37